No. 763,453. PATENTED JUNE 28, 1904.
W. A. ALEXANDER.
ATTACHING AND DETACHING DEVICE.
APPLICATION FILED NOV. 26, 1902. RENEWED DEC. 2, 1903.
NO MODEL.
2 SHEETS—SHEET 1.
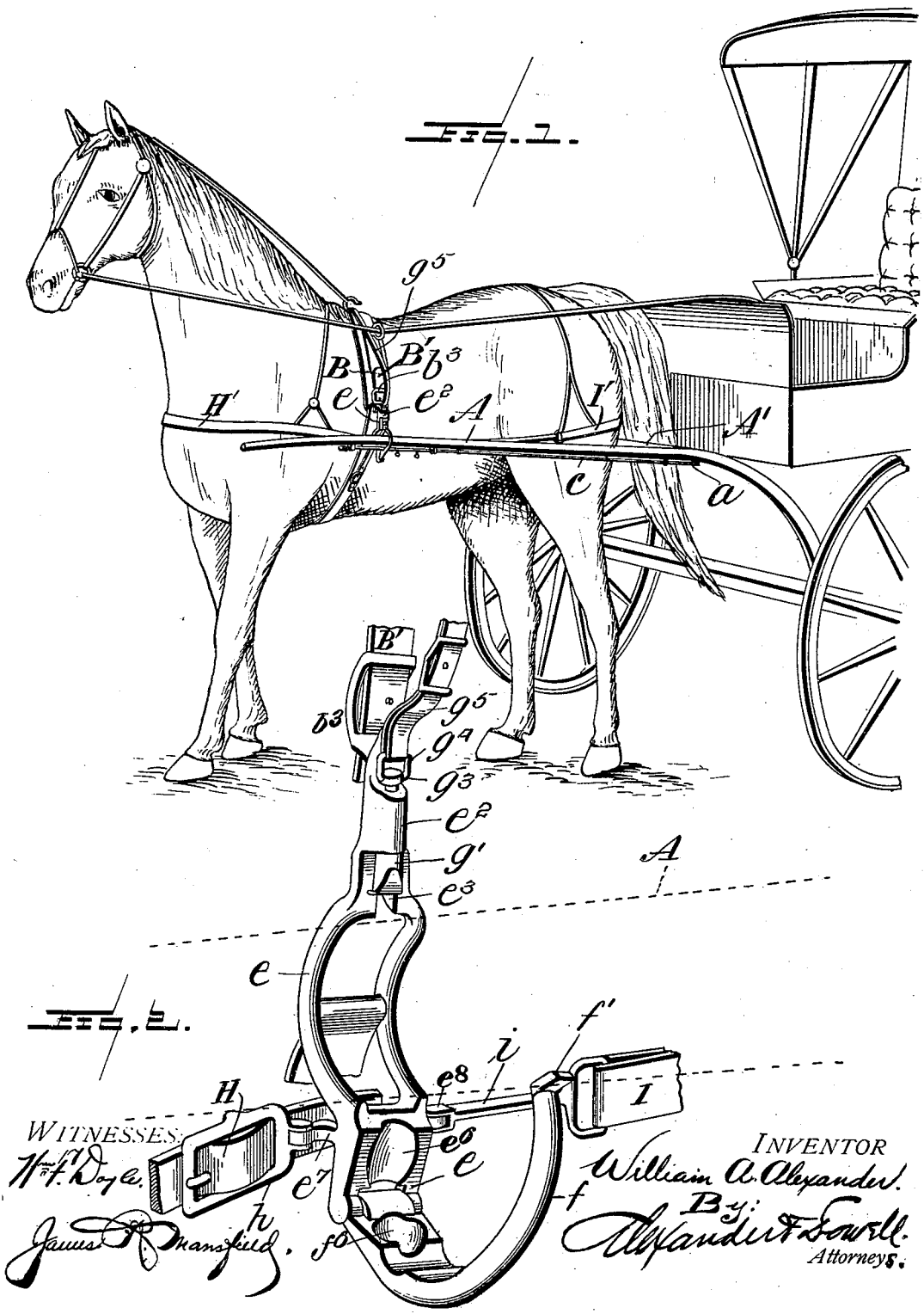

No. 763,453.
PATENTED JUNE 28, 1904.
W. A. ALEXANDER.
ATTACHING AND DETACHING DEVICE.
APPLICATION FILED NOV. 26, 1902. RENEWED DEC. 2, 1903.
NO MODEL.
2 SHEETS—SHEET 2.
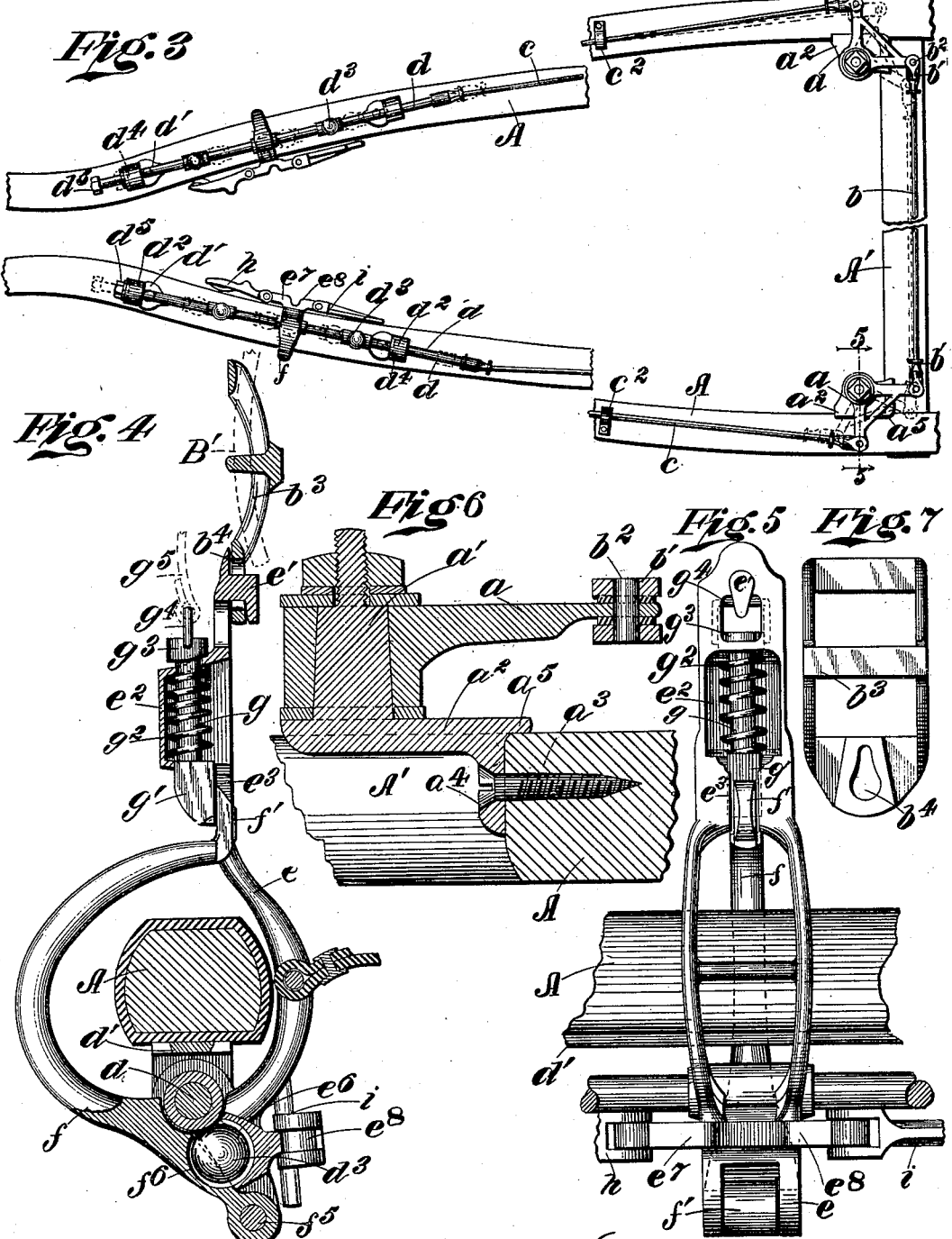
WITNESSES
C. Edward Duffey
James R. Mansfield
INVENTOR
William A. Alexander
By Alexander & Sowell
Attorneys No. 763,453. Patented June 28, 1904.

UNITED STATES PATENT OFFICE.

WILLIAM A. ALEXANDER, OF CHICAGO, ILLINOIS, ASSIGNOR TO THE QUICK HITCH MFG. COMPANY, OF NEW YORK, N. Y.

ATTACHING AND DETACHING DEVICE.

SPECIFICATION forming part of Letters Patent No. 763,453, dated June 28, 1904.

Application filed November 26, 1902. Renewed December 2, 1903. Serial No. 183,535. (No model.)

*To all whom it may concern:*

Be it known that I, WILLIAM A. ALEXANDER, of Chicago, in the county of Cook and State of Illinois, have invented certain new and useful Improvements in Attaching and Detaching Devices; and I hereby declare that the following is a full, clear, and exact description thereof, reference being had to the accompanying drawings, which form part of this specification.

This invention is an improved means for hitching and unhitching horses to vehicles, comprising an improved harness and draft-rigging for the thills or shafts, combined so that the horse may be hitched and unhitched to the vehicle with the greatest ease and rapidity.

The objects of the invention are to reduce the number of parts of the harness, to lessen the number of connections that have ordinarily to be made in hitching the horse to the vehicle, to provide means for instantly releasing or unhitching the horse, to provide a novel draft connection between harness and vehicle whereby perfect ease of motion is permitted the animal and at the same time the pull is more direct on the vehicle than with the ordinary harness, and also to provide a simple draft connection which will allow free shoulder motion of the animal, while doing away with the ordinary swinging swingletree, if desired.

The invention consists in the simple novel construction of the harness and draft-rigging and in novel details of construction and combinations of parts hereinafter specified in the claims, to which I refer for summaries of the various features and combinations constituting the present invention and for which protection is desired.

In said drawings, Figure 1 is a perspective view of a horse hitched to a vehicle by means of my improved harness and draft-rigging. Fig. 2 is a perspective view, enlarged, of one of the shaft tugs or loops open. Fig. 3 is a bottom plan view of the harness and rigging. Fig. 4 is a vertical sectional view of one of the tugs. Fig. 5 is a rear view thereof. Fig. 6 is an enlarged section on line 5 5, Fig. 3. Fig. 7 is a detail.

The invention is applicable to any vehicle using ordinary shafts or thills and to ordinary harness using either collar or breast-strap. The invention, however, dispenses with the ordinary swingletree, the ordinary draft-traces, and ordinary holdback connections on shafts, and in its entirety provides a very simple, strong, and efficient draft harness and rigging whereby a horse can be hitched in a few seconds and unhitched instantly. At the same time the attachment is strong, comfortable to the animal, and less cumbersome than the ordinary harness.

The parts which are old are designated in the drawings by capital letters, and the novel parts appertaining to the present invention are designated by small letters. The old parts are merely used to illustrate, not to limit, the invention and facilitate an understanding thereof.

To the thills or shafts A near the draft-bar A' are pivoted bell-crank levers $a$. These are preferably placed beneath the thills and may be pivoted on studs $a'$, attached to castings $a^2$, which are provided with lugs $a^3$, adapted to engage apertures in the inner sides of the thills and are secured thereto by screws $a^4$, as shown. The castings may be lipped under the thills, as at $a^5$. I do not wish to restrict myself to the specific form of casting shown, although that is practical. The rearwardly-extending arms of the two bell-crank levers $a\ a$ are united by a connection $b$, which may be of any suitable kind, a wire rope being shown in drawings, the ends of this connection having double eyes $b'$ embracing the ends of the lever-arms and secured thereto by pivot-pins $b^2$, as shown. The particular kind of connection is not an essential feature of the invention. The other outwardly-extending arms of levers $a\ a$ are connected to the rear ends of forwardly-extending shaft members $c$, which may be of any suitable kind, as shown. These draft members are wire ropes, which are connected to the levers $a$ like the connection $b$. The draft members $c$ extend forward beneath the served that the connection between the harness and thills is such that the pull of the animal is directly transmitted to the vehicle, yet the shoulder motion of the animal is provided for by reason of the rocking motion of the levers $a$ and their connection $b$, the parts $a$, $b$, $c$, and $d$ permitting the same free movement and play of the horse's shoulders and muscles as is permitted by the use of an ordinary swingletree. This freedom of movement prevents any shifting motions of the breast-strap on the animal and lessens its discomfort when working.

The invention dispenses with the usual long traces, the ordinary leather shaft-tugs, swingletree, and holdback devices on shafts, although in some cases the rods $d$ could be connected to an ordinary swingletree. In hitching up after the harness is on the animal it is simply brought into position between the shafts and the shaft-tugs closed over the shafts and simultaneously engaged with rods $d$, as described. This requires but one operation at each side. In unhitching the operator simply has to pull straps $g^5$, so as to cause bolts $g$ to disengage the retaining members $f$, which instantly drop open and the animal is free of the vehicle.

Having thus described my invention, what I therefore claim as new, and desire to secure by Letters Patent thereon, is—

1. A thill-engaging member for harness, comprising a casting attached to the back-saddle, a retaining member pivoted to the lower end of said casting, a spring-catch on the upper end of the first casting adapted to engage the upper end of the retaining member and lock the same around a shaft, a connection between the casting and the trace-tug of the harness, and another connection between the casting and the holdback-strap, substantially as described.

2. In combination the thills, the draft and holdback portions of a harness, and shaft-tugs attached to the harness, each comprising two hinged members adapted to embrace a shaft, and means for holding said members in closed position, said members having recesses in their opposed faces; with rods attached to the thills, and projections on the rods adapted to engage and be confined in the recesses of the loops, substantially as described.

3. The combination of slidable rods attached to the thills, and draft connections between said rods and the thills; with split hinged shaft-tugs attached to the harness, and devices for locking the tugs to the rods comprising globular projections on the rods, and sockets on the tugs substantially as described.

4. In a harness, the combination of a shaft-tug, comprising a casting attached to the back-saddle, a retaining member pivoted at its lower end to the lower end of said casting, a spring-bolt on the upper end of the first casting adapted to engage the upper end of the retaining member to lock the same around a shaft; a connection between the shaft-tug and the hame-tug of the harness, and another connection between the shaft-tug and the holdback-strap, substantially as and for the purpose described.

5. In combination the shafts, the draft and holdback portions of a harness, the shaft-tugs attached to the harness, each comprising two hinged members adapted to embrace a shaft, one member having a bolt-keeper on its upper end, a bolt therein, and the other member having a lug adapted to be engaged by the bolt to lock the members in closed position, said members having recesses in their opposed faces; with rods attached to the thills, draft members connecting said rods to the thills, and projections on the rods adapted to be engaged by and retained in the recesses of the tug members for the purpose and substantially as described.

In testimony that I claim the foregoing as my own I affix my signature in presence of two witnesses.

WILLIAM A. ALEXANDER.

In presence of—
ARTHUR E. DOWELL,
JAMES R. MANSFIELD.